(12) United States Patent
Koelling

(10) Patent No.: US 11,014,709 B2
(45) Date of Patent: *May 25, 2021

(54) STORAGE RECEPTACLE STACKING SYSTEM

(71) Applicant: REGENCY SEATING, INC., Akron, OH (US)

(72) Inventor: Bryan Koelling, Fremont, CA (US)

(73) Assignee: Regency Seating, Inc., Akron, OH (US)

( * ) Notice: Subject to any disclaimer, the term of this patent is extended or adjusted under 35 U.S.C. 154(b) by 110 days.

This patent is subject to a terminal disclaimer.

(21) Appl. No.: 16/277,195

(22) Filed: Feb. 15, 2019

(65) Prior Publication Data
US 2019/0241312 A1    Aug. 8, 2019

Related U.S. Application Data

(63) Continuation of application No. 15/093,885, filed on Apr. 8, 2016, now Pat. No. 10,472,127.
(Continued)

(51) Int. Cl.
*B65D 21/02* (2006.01)
*A47B 47/04* (2006.01)
(Continued)

(52) U.S. Cl.
CPC ........ *B65D 21/0202* (2013.01); *A47B 47/042* (2013.01); *A47B 87/0284* (2013.01);
(Continued)

(58) Field of Classification Search
CPC ........... B65D 21/0202; B65D 21/0228; B65D 88/022; B65D 21/0201; B65D 90/0006;
(Continued)

(56) References Cited

U.S. PATENT DOCUMENTS

| 453,192 A | 6/1891 | Jones, Sr. |
| 3,527,486 A | 9/1970 | Gamp et al. |

(Continued)

FOREIGN PATENT DOCUMENTS

JP    2002 106 525    4/2002

OTHER PUBLICATIONS

Search Report for PCT/US2016/026585 ISR dated Jul. 28, 2016 and Published Oct. 2016.

*Primary Examiner* — Shawn M Braden
(74) *Attorney, Agent, or Firm* — Edwin A. Sisson, Attorney at Law, LLC; Jeffrey J. Banyas

(57) ABSTRACT

Provided is a storage receptacle stacking system comprising a set of receptacles. Each receptacle is an open rectangular prism defined by, a back panel, which has a top edge, a bottom edge, a right edge, and a left edge, and a first back panel surface, and a set of side panels. The set of side panels has top, bottom, left, and right panels. Each receptacle is removably engaged to at least one other receptacle by a first set of fasteners. For each receptacle, at least one of the panels in the set of side panels is adjacent to and parallel with at least one of the panels in the set of side panels of another receptacle, and any one of the panels in the set of side panels may be engaged in the alternative with any one of the panels in the set of side panels of any other receptacle.

14 Claims, 18 Drawing Sheets

Related U.S. Application Data

(60) Provisional application No. 62/144,596, filed on Apr. 8, 2015.

(51) Int. Cl.
*A47B 87/02* (2006.01)
*F16B 12/24* (2006.01)
*F16B 5/02* (2006.01)
*F16B 21/18* (2006.01)
*F16B 35/06* (2006.01)

(52) U.S. Cl.
CPC ........ *B65D 21/0228* (2013.01); *F16B 5/0275* (2013.01); *F16B 5/0291* (2013.01); *F16B 12/24* (2013.01); *F16B 21/186* (2013.01); *F16B 35/06* (2013.01)

(58) Field of Classification Search
CPC . A47B 47/042; A47B 87/0284; F16B 5/0275; F16B 5/0291; F16B 12/24; F16B 21/186; F16B 35/06
See application file for complete search history.

(56) References Cited

U.S. PATENT DOCUMENTS

| | | |
|---|---|---|
| 6,520,704 B1 | 2/2003 | Vidmar et al. |
| 7,004,699 B2 | 2/2006 | Petrok et al. |
| 7,431,409 B2 | 10/2008 | Yang |
| 8,186,776 B2 | 5/2012 | Zalewski |
| 8,414,092 B2 | 4/2013 | Zalewski et al. |
| 8,573,716 B2 | 11/2013 | Zalewski |
| 9,060,602 B2 | 6/2015 | Chen |
| 2005/0023944 A1 | 2/2005 | Baker |
| 2006/0250052 A1* | 11/2006 | Davis .................. A47B 47/042 312/107 |
| 2007/0080089 A1 | 4/2007 | Anschutz |
| 2008/0012454 A1 | 1/2008 | Kim |
| 2009/0309464 A1 | 12/2009 | Schwartz |
| 2010/0019630 A1 | 1/2010 | Leng |
| 2010/0119629 A1 | 5/2010 | Olalde Rangel |
| 2010/0290831 A1 | 11/2010 | Burnett et al. |
| 2012/0142200 A1 | 6/2012 | Ito et al. |
| 2012/0242200 A1 | 9/2012 | Keragala |
| 2015/0108880 A1 | 4/2015 | Chung |

* cited by examiner

STORAGE RECEPTACLE STACKING SYSTEM

This application is a continuation application of pending U.S. application Ser. No. 15/093,885 filed Apr. 8, 2016 and claims priority to U.S. Ser. No. 62/144,596, filed Apr. 8, 2015 and U.S. application Ser. No. 15/093,885 filed Apr. 8, 2016, entitled Storage Receptacle Stacking System, with the contents of each application herein incorporated by reference in their entirety.

I. BACKGROUND

It is desirable to provide storage articles, in particular, open box style five-sided receptacles. These open receptacles may be used for storage and these receptacles may be stacked to provide a stacked storage system.

Ready to assemble furniture has been around since the late 1940s. Companies such as Sauder have been producing ready to assemble items since the 1950s.

It remains desirable to provide a ready to assemble storage receptacle stacking system.

II. SUMMARY

In accordance with one aspect of the present subject matter provided is a storage receptacle stacking system comprising a set of receptacles. Each receptacle is an open rectangular prism defined by, a back panel, which has a top edge, a bottom edge, a right edge, and a left edge, and a first back panel surface, and a set of side panels. The set of side panels has top, bottom, left, and right panels. Each receptacle is removably engaged to at least one other receptacle by a first set of fasteners. For each receptacle, at least one of the panels in the set of side panels is adjacent to and parallel with at least one of the panels in the set of side panels of another receptacle, and any one of the panels in the set of side panels may be engaged in the alternative with any one of the panels in the set of side panels of any other receptacle.

Still other benefits and advantages of the present subject matter will become apparent to those skilled in the art to which it pertains upon a reading and understanding of the following detailed specification.

III. BRIEF DESCRIPTION OF THE DRAWINGS

The present subject matter is described hereinafter with reference to the accompanying drawings.

IV. DETAILED DESCRIPTION

Figure 12:
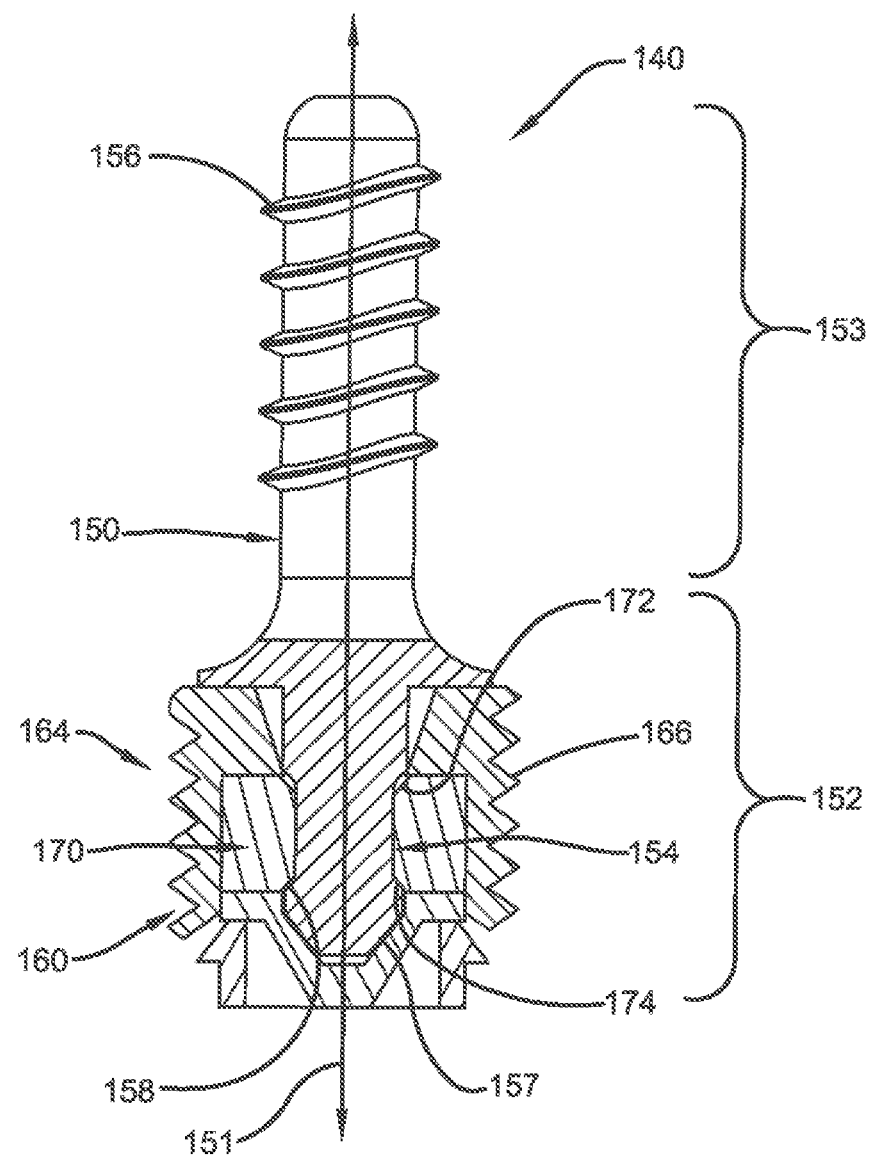
FIG. 12 is a cross-sectional view of a first example of a removable fastener.
Figure 13:
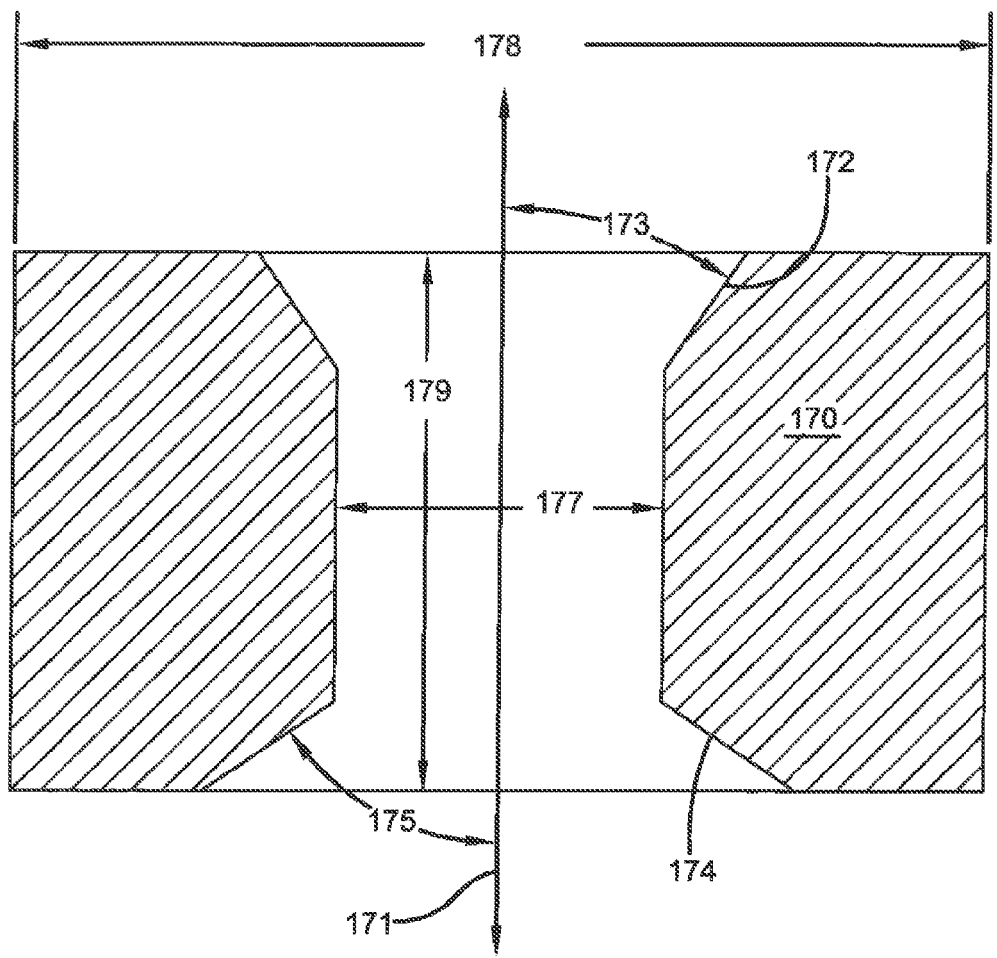
FIG. 13 is a cross-sectional view of a first example of a split ring.

Referring now to the drawings wherein the showings are for purposes of illustrating the present subject matter only and not for purposes of limiting the same, and wherein like reference numerals are understood to refer to like components, FIGS. 1-5 show views of panels of one example of a storage receptacle. FIGS. 6-11 show various non-limiting examples of a storage receptacle stacking system. FIGS. 12-13 show one non-limiting example of a mechanical fastener usable in a storage receptacle stacking system. FIGS. 14-19 show a non-limiting example of a receptacle and the panels and fasteners. As used herein the terms top, bottom, left, right, and back are used for ease of understanding and convenience, but are not to be intended to be limiting: the apparatus may have any orientation in space.

Figure 6:
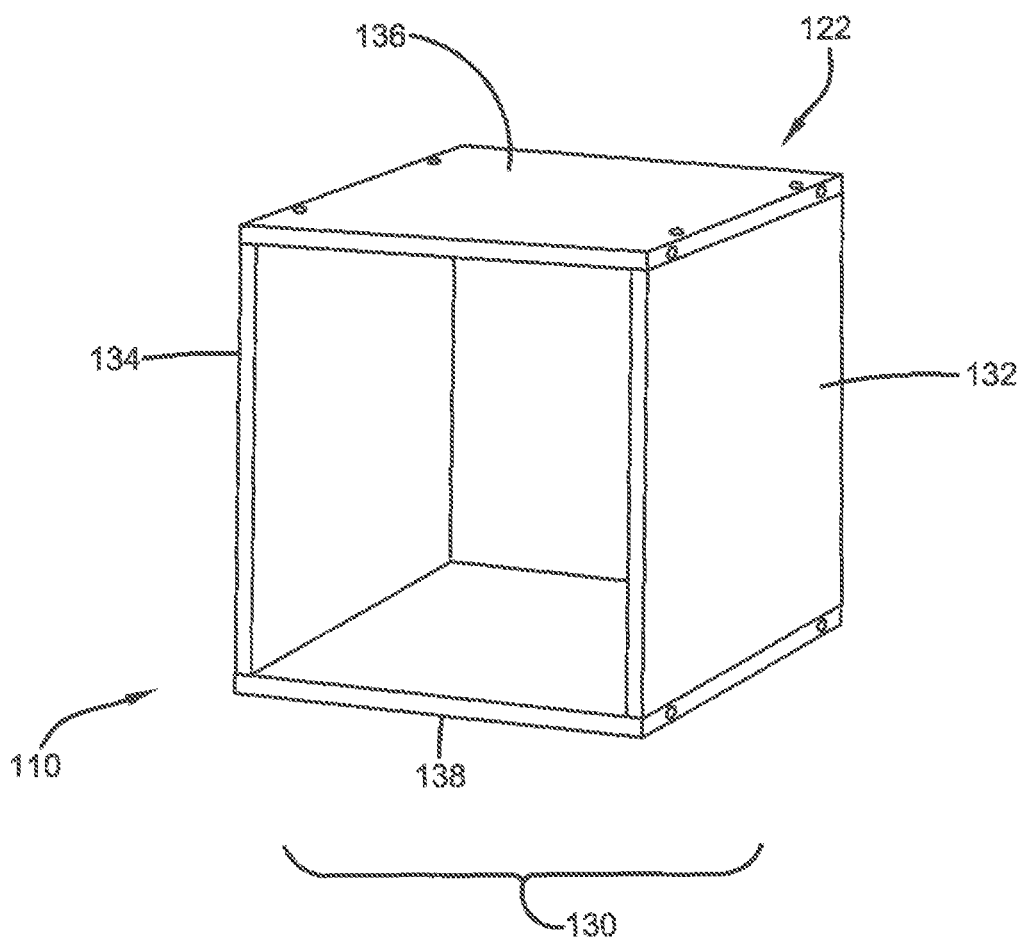
FIG. 6 is a perspective view of a first example of a receptacle.

FIG. 6 shows one non-limiting example of a first receptacle 110 of a storage receptacle stacking system 100 which comprises a set of receptacles 105. The first receptacle 110 is a hollow, open rectangular prism. The first receptacle 110 is defined by a back panel 122 and a set of side panels 130. In the non-limiting example of first receptacle 110, the first receptacle 110 is a rectangular prism and, the set of side panels 130 has four panels, one for each side of the rectangular prism base defined by the rectangular back panel 122. In other examples, a receptacle may be a hexagonal prism where the set of side panels has six panels, or a triangular prism where the set of side panels has three panels, or a trapezoidal prism where the set of side panels has four panels, or a prism form of a Penrose tile (that is, a prism having the cross-section of a Penrose tile), or other geometry chosen with good engineering judgment. Referring to FIGS. 7-11, as will be described further herebelow the set of receptacles 105 may comprise a first receptacle 110, a second receptacle 111, and, optionally, one or more other receptacles 112, 113, 114, 115, 116, 117, 118, 119.

Referring now to FIGS. 1-6, in the non-limiting example shown, the back panel 122 is substantially planar, rectangular, and has: a first back panel surface 123; a second back panel surface 124 opposite the first back panel surface 123; a top edge 125; a bottom edge 126 opposite the top edge 125; a right edge 127 connecting the top edge 125 and the bottom edge 126; and a left edge 128 opposite the right edge 127, connecting the top edge 125, and the bottom edge 126. In the non-limiting example shown, the set of side panels 130 has a top panel 132, a bottom panel 134, a left panel 136, and a right panel 138.

Figure 1:
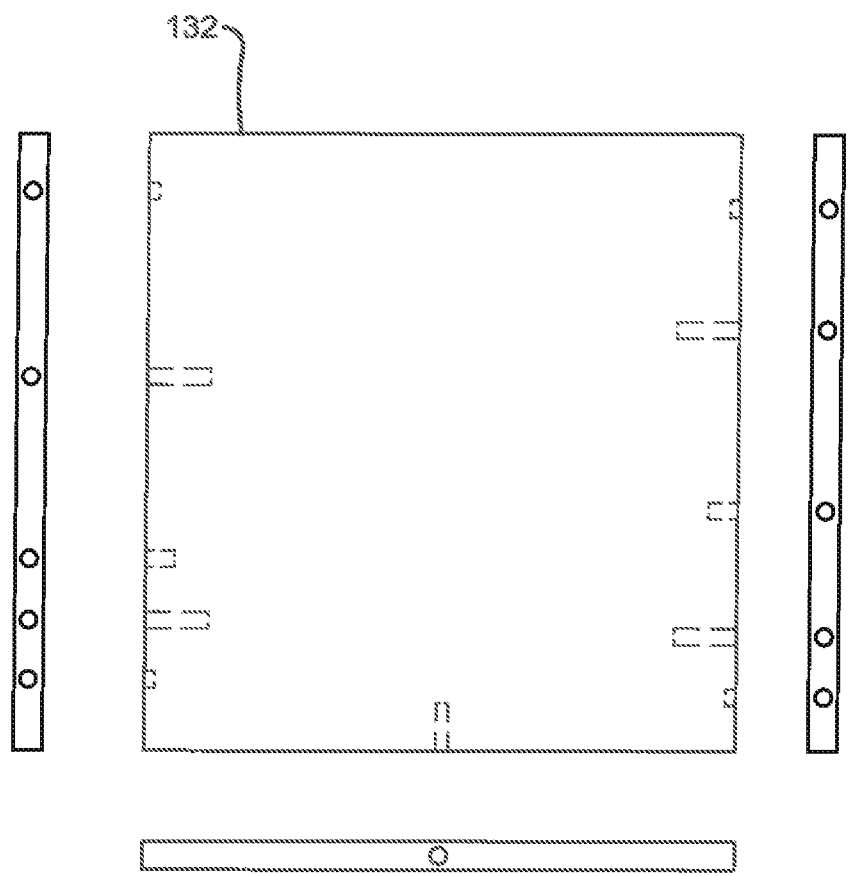
FIG. 1 is an orthogonal projection of a first example of a top panel showing multiple views.
Figure 2:
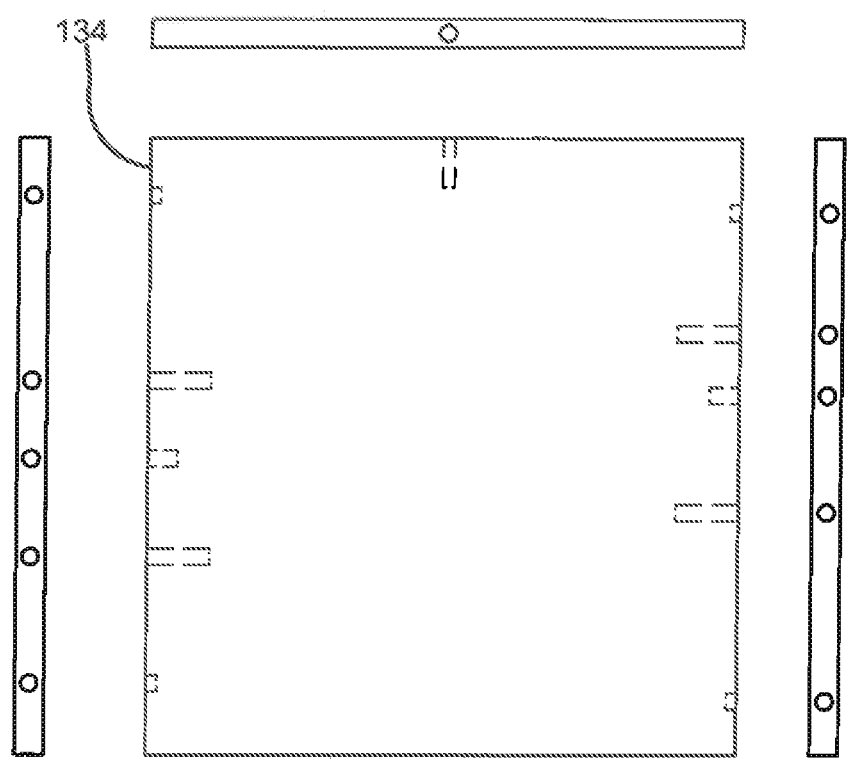
FIG. 2 is an orthogonal projection of a first example of a bottom panel showing multiple views.
Figure 3:
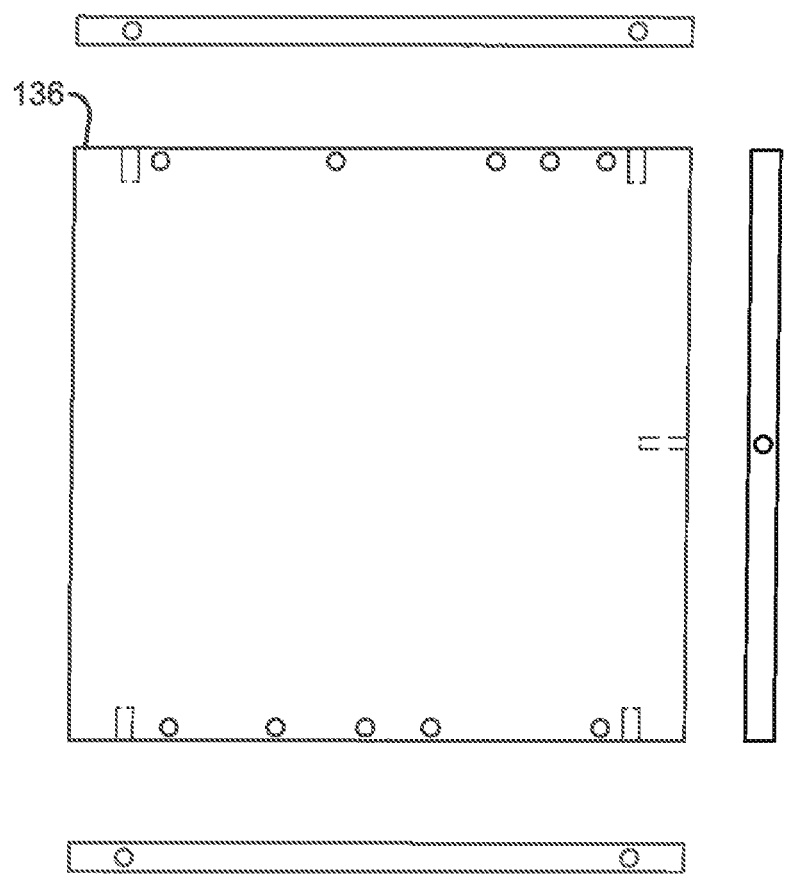
FIG. 3 is an orthogonal projection of a first example of a left panel showing multiple views.
Figure 4:
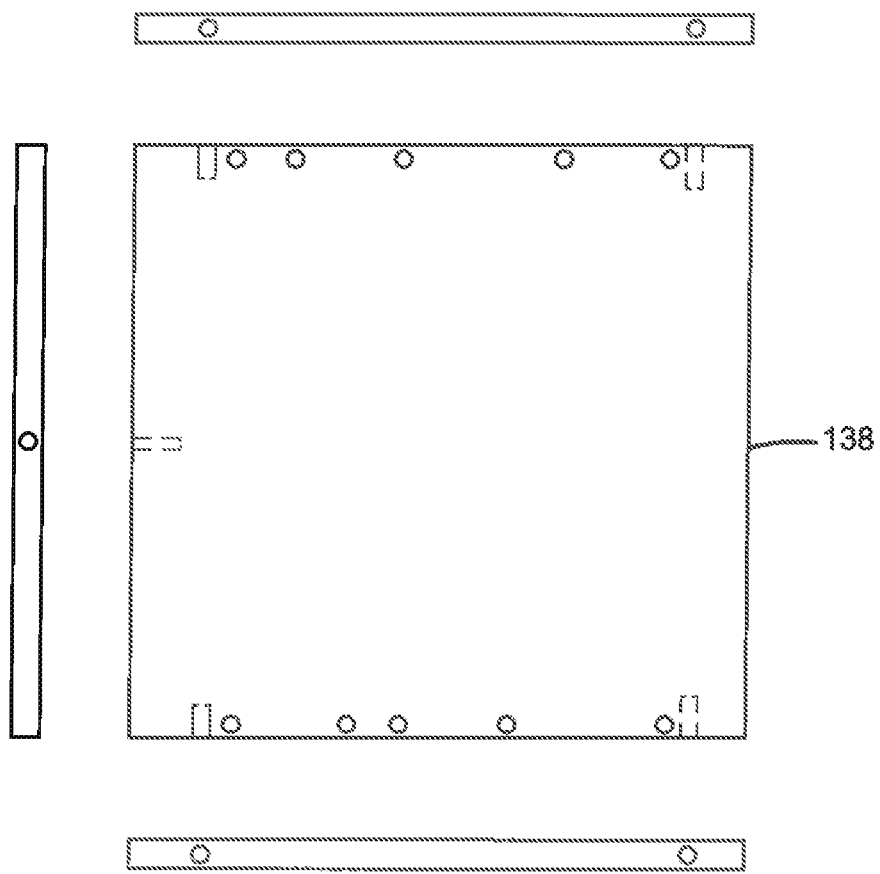
FIG. 4 is an orthogonal projection of a first example of a right panel showing multiple views.
Figure 5:
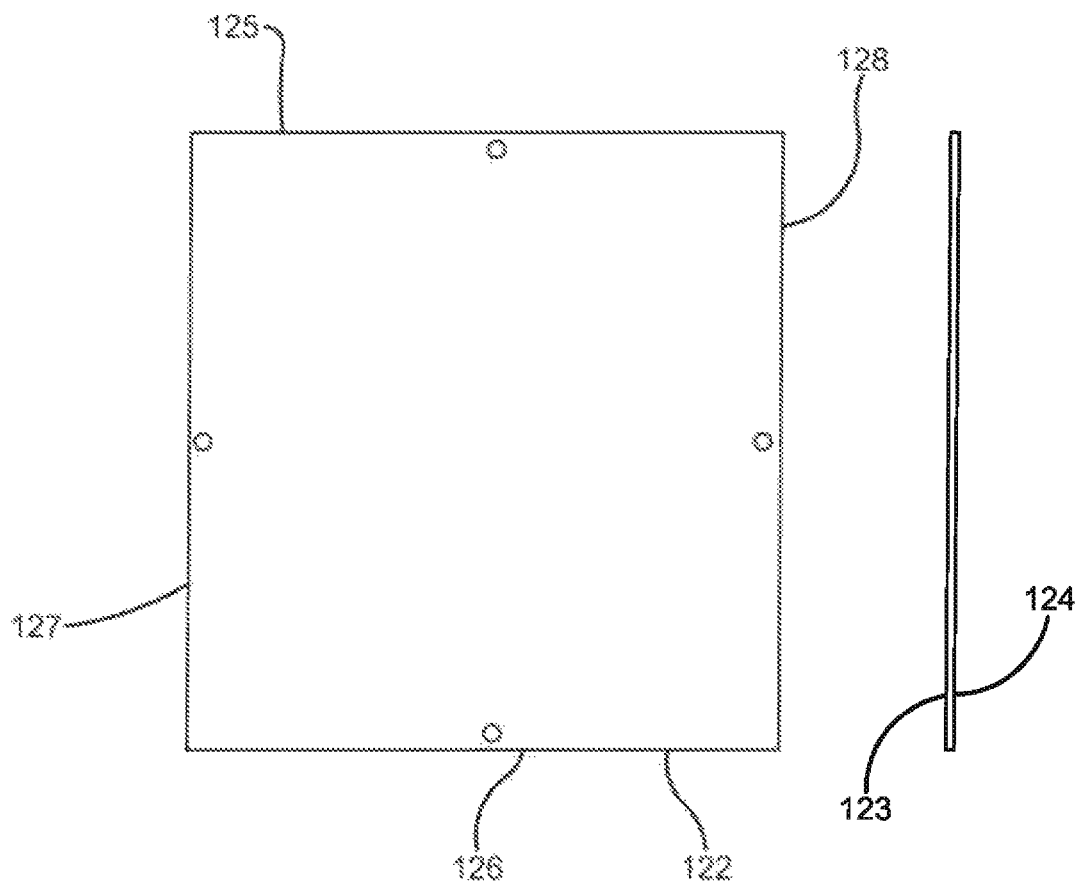
FIG. 5 is an orthogonal projection of a first example of a back panel showing multiple views.

In the non-limiting example shown, the top panel 132 is adjacent to, parallel to, and engaged with the top edge 125 of the back panel 122, and extends perpendicularly from the first back panel surface 123. As shown in FIG. 1, the non-limiting example of the top panel 132 may be substantially planar and rectangular. The non-limiting example of the bottom panel 134 is adjacent to, parallel to, and engaged with the bottom edge 126 of the back panel 122, and extends perpendicularly from the first back panel surface 123. As shown in FIG. 2, the non-limiting example of the bottom panel 134 may be substantially planar and rectangular. The non-limiting example of the left panel 136 is adjacent to, parallel to, and engaged with the left edge 127 of the back panel 122, and extends perpendicularly from the first back panel surface 123. As shown in FIG. 3, the non-limiting example of the left panel 136 may be substantially planar and rectangular. The non-limiting example of the right panel 138 is adjacent to, parallel to, and engaged with the right edge 128 of the back panel 122, and extends perpendicularly from the first back panel surface 123. As shown in FIG. 4, the non-limiting example of the right panel 138 may be substantially planar and rectangular. Each of the panels 132, 134, 136, 138 in the set of side panels 130 may be engaged with the back panel by one or more of an adhesive, or a mechanical fastener. An adhesive may be any adhesive chosen with good engineering judgment. A mechanical fastener may be a screw, a bolt, a nut, a clip, a clamp, a pin, a variety of split ring captured pin fastener 140, or other fastener chosen with good engineering judgment.

Referring now to FIGS. 6-13, each receptacle 110, 111, 112, 113, 114, 115, 116, 117, 118, 119 in the set of receptacles 105 is removably engaged to at least one other receptacle by a first set of mechanical fasteners 140. For each receptacle 110, 111, 112, 113, 114, 115, 116, 117, 118, 119 at least one of the panels in the set of side panels 130 is adjacent to and parallel with at least one of the panels in the set of side panels 130 of another receptacle. For each receptacle 110, 111, 112, 113, 114, 115, 116, 117, 118, 119 any one of the panels in the set of side panels 130 may be engaged in the alternative with any one of the panels in the set of side panels 130 of any other receptacle. In some non-limiting examples, each of the receptacles in the set of receptacles 105 is substantially identical in size and shape. In other non-limiting examples, one or more of the receptacles in the set of receptacles 105 is substantially different in size, or is substantially different in shape, or is substantially different in both size and shape from one or more of the other receptacles in the set of receptacles 105.

In some non-limiting examples, each of the receptacles in the set of receptacles 105 is substantially identical in size and shape such that each is congruent with each other, each receptacle is a prism having an axis of elongation, the receptacles are collectively arranged in an array in which each axis of each prism is parallel with each other axis of each other prism and the array tessellates the plane perpendicular to the axes of the prisms in a repeating pattern. It is to be understood that these repeating patterns are periodic.

In some non-limiting examples, the set of receptacles 105 is defined by a first sub-set of receptacles 107 and a second sub-set of receptacles 109 wherein each of the receptacles in the first sub-set of receptacles 107 is substantially identical in size and shape to every other receptacle in the first sub-set of receptacles 107 such that each of the receptacles in the first sub-set of receptacles 107 is congruent with each of the other receptacles in the first sub-set of receptacles 107 and wherein each of the receptacles in the second sub-set of receptacles 109 is substantially identical in size and shape to every other receptacle in the second sub-set of receptacles 109 such that each of the receptacles in the second sub-set of receptacles 109 is congruent with each of the other receptacles in the second sub-set of receptacles 109, but wherein the receptacles in the first sub-set of receptacles 107 differ in size or shape or both from that of the receptacles in the second sub-set of receptacles 109. In some of these latter non-limiting examples, each receptacle in the first sub-set of receptacles 107, and each receptacle in the second sub-set of receptacles 109 is a prism having an axis of elongation, the receptacles in the first sub-set of receptacles 107, and in the second sub-set of receptacles 109 are collectively arranged in an array in which each axis of each prism is parallel with each other axis of each other prism, and the array tessellates the plane perpendicular to the axes of the prisms in a non-repeating pattern. It is to be understood that these non-repeating patterns are aperiodic. One non-limiting example of such an aperiodic pattern is a Penrose tiling such as the Penrose P2 tiles, also known as the kite and dart tiles. The kite tile is a quadrilateral whose four interior angles are 72, 72, 72, and 144 degrees. The dart tile is a non-convex quadrilateral whose four interior angles are 36, 72, 36, and 216 degrees.

A split ring captured pin fastener 140 may be used to provide operational engagement within a receptacle, such as fastening a side panel to a back panel in a receptacle. The fasteners 140 may be pressed through a panel, such as without limitation, press through a side panel into a top panel or bottom, or pressed through the back panel into a side panel, to facilitate engagement. Alternatively, fasteners may be held in threaded engagement with one or more panels by male or female threads. Alternatively, fasteners may be held in engagement with one or more panels by spurs or clips or clamps.

A split ring captured pin fastener 140 may be used to provide operational engagement between two receptacles, such as fastening a side panel of a first receptacle 110 to a side panel of a second receptacle 111. Referring now to FIG. 12, in one non-limiting example a split ring captured pin fastener 140 may comprises a male pin 150 and female housing 160. The male pin 150 defines an axis of elongation 151 and may comprise a female engagement portion 152 and a part engagement portion 153. The part engagement portion 153 is adapted for engagement with a first part. The first part may be a back panel 122, or a panel in a set of side panels 130, or another part of a receptacle 110. In the non-limiting example shown in FIG. 12, the part engagement portion 153 comprises the fastening elements 156 of a screw. In certain examples, the part engagement portion 153 may comprise the fastening elements of a screw, a bolt, a nut, another threaded component, a clip, a clamp, spurs, or another fastener chosen with good engineering judgment. The female engagement portion 152 is adapted for engagement with the female housing 160. In the non-limiting example shown in FIG. 12, female engagement portion 152 is a substantially cylindrical shaft comprising a narrow saddle 154. The saddle 154 is adapted for engagement by a split ring 170. In the non-limiting example shown as the male pin is initially inserted through the split ring, it opens the split ring 170, deforming it elastically, and increasing the elastic energy stored in the split ring 170. As the male pine 150 is further inserted, the split ring will closes around the narrow saddle 154 and thereby engage the male pin. When the saddle 154 of male pin 150 is engaged with the split ring 170, the split ring creates substantial resistance to axial movement of the male pin 150 along the axis of elongation 151 and thereby retains the male pin 150 in the split ring 170. This engagement between the male pin 150 and the split ring 170 is vibration resistant and will not disengage unless a critical disengagement force is applied to input deformation energy into the split ring 170 sufficient to permit the male pin to be removed. In the non-limiting example shown in FIG. 12, the split ring 170 is captured by and held substantially fixed by and within the female housing 160 so that as the split ring 170 retains the male pin 150 in the split ring 170, it also retains the male pin 150 within the female housing 160. The female housing 160 in turn comprises a part engagement feature 164. The part engagement feature 164 is adapted for engagement with a second part. The second part may be a back panel 122, or a panel in a set of side panels 130, or another part of a receptacle 110. In the non-limiting example shown in FIG. 12, the part engagement feature 164 comprises the fastening elements 166 of a screw. In certain examples, the part engagement feature 164 may comprise the fastening elements 166 of a screw, a bolt, a nut, another threaded component, a clip, a clamp, spurs, or another fastener chosen with good engineering judgment. By engaging the first part to the part engagement portion 153 of the male pin 150, and by engaging the second part to the part engagement feature 164 of the female housing 160, the nature of the engagement of the first part to the second part may be controlled by the nature of the engagement of the male pin 150 to the female housing 160, which as noted above is a function of the engagement of the male pin 150 to the split ring 170.

The split ring 170 may comprise an elastic material such as a polymer, or elastic metal or elastic metal alloy. The elasticity of the material of which the split ring is comprised may be chosen with good engineering judgment. As shown in FIGS. 12-13, in certain non-limiting examples, the split ring 170 may comprise an axis of elongation 171 that, as installed in the split ring captured pin fastener 140 will coincide with axis 151. As shown in FIGS. 12-13, in certain non-limiting examples, the split ring 170 may comprise a ring having an inside diameter and an outside diameter. The split ring 170 may comprise an insertion chamfer 172 at the top of the inner diameter. An insertion chamfer 172 may be angled with respect to the axis of elongation 171 by some insertion angle 173 and may provide a sloping surface in the direction of insertion, that is, the direction along which the male pin 150 is moved in order to insert it into the split ring 170, in order to facilitate insertion. The split ring 170 may comprise a desertion chamfer 174 at the bottom of the inner diameter. A desertion chamfer 174 may be angled by some desertion angle 175 with respect to the axis of elongation 171 and may provide a sloping surface in the direction of desertion, that is, the direction along which the male pin 150 is moved in order to withdraw it from the split ring 170, in order to facilitate withdraw. As shown in FIG. 12, in certain non-limiting examples, the male pin 150 may comprise an insertion chamfer 157 and a desertion chamfer 158. An insertion chamfer 157 may be angled with respect to the axis of elongation 151 and may provide a sloping surface in the direction of insertion, that is, the direction along which the male pin 150 is moved in order to insert it into the split ring 170, in order to facilitate insertion. A desertion chamfer 158 may be angled with respect to the axis of elongation 151 and may provide a sloping surface in the direction of desertion, that is, the direction along which the male pin 150 is moved in order to withdraw it from the split ring 170, in order to facilitate withdraw. In certain examples, one or more of the inside diameter 177 of the split ring 170, the outside diameter 178 of the split ring 170, the height 179 of the split ring 170, the material of which the split ring is comprised, the elasticity of the material of which the split ring is comprised, the angle of the insertion chamfer 172 with respect to the axis of elongation 151, the angle of the desertion chamfer 174 with respect to the axis of elongation 151, the angle of the insertion chamfer 157 with respect to the axis of elongation 151, the angle of the desertion chamfer 158 with respect to the axis of elongation 151, may be chosen to provide the desired force or range of forces needed to engage the male pin 150 with the female housing 160 and to provide the desired force or range of forces needed to disengage the male pin 150 from the female housing 160.

One type of split ring captured pin fastener 140 is available from Lockdowel, Inc. in Fremont, Calif.

In the non-limiting example shown in FIGS. 1-11, each receptacle 110, 111, 112, 113, 114, 115, 116, 117, 118, 119 may be assembled by fastening the left and right side panels to the top and bottom panels, and then fastening the back panel to the top, bottom, left, and right side panels. Either the left and right side panels or the top and bottom panels may have openings for receiving fasteners, such as mechanical fastener 140, for allowing each receptacle 110, 111, 112, 113, 114, 115, 116, 117, 118, 119 to be engageable to another receptacle 110, 111, 112, 113, 114, 115, 116, 117, 118, 119. In one aspect, the receptacles 110, 111, 112, 113, 114, 115, 116, 117, 118, 119 may be stackable using spring pins or other mechanical fasteners 140, which can be inserted into the top and bottom surfaces of the left and right side panels. The receptacles 110, 111, 112, 113, 114, 115, 116, 117, 118, 119 may also be connected side to side as well. The outer surfaces of the left and right side panels may have openings which can receive additional fasteners for connecting receptacles 110, 111, 112, 113, 114, 115, 116, 117, 118, 119 side to side.

Figure 7:
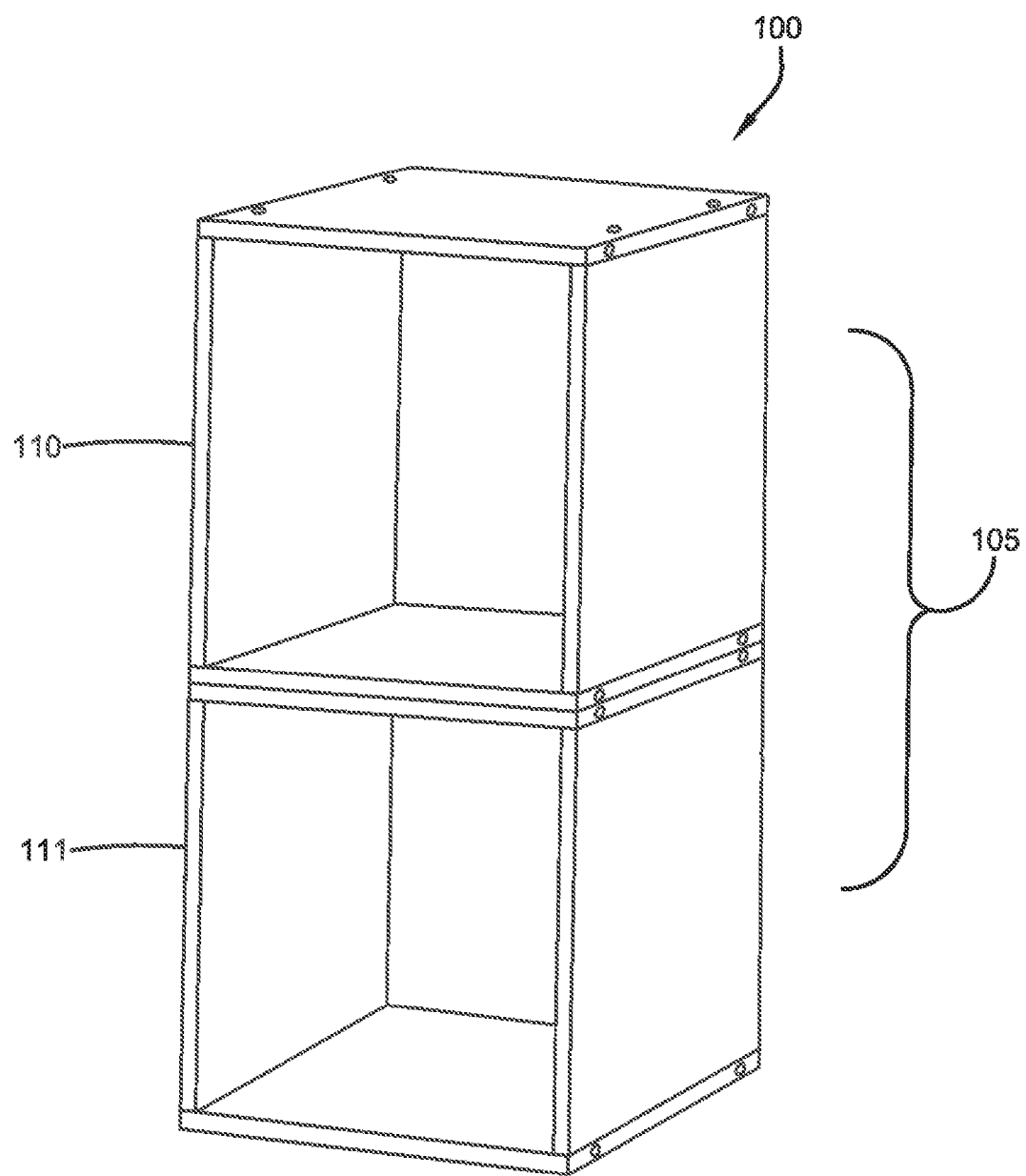
FIG. 7 is a perspective view of a first example of two engaged receptacles.
Figure 8:
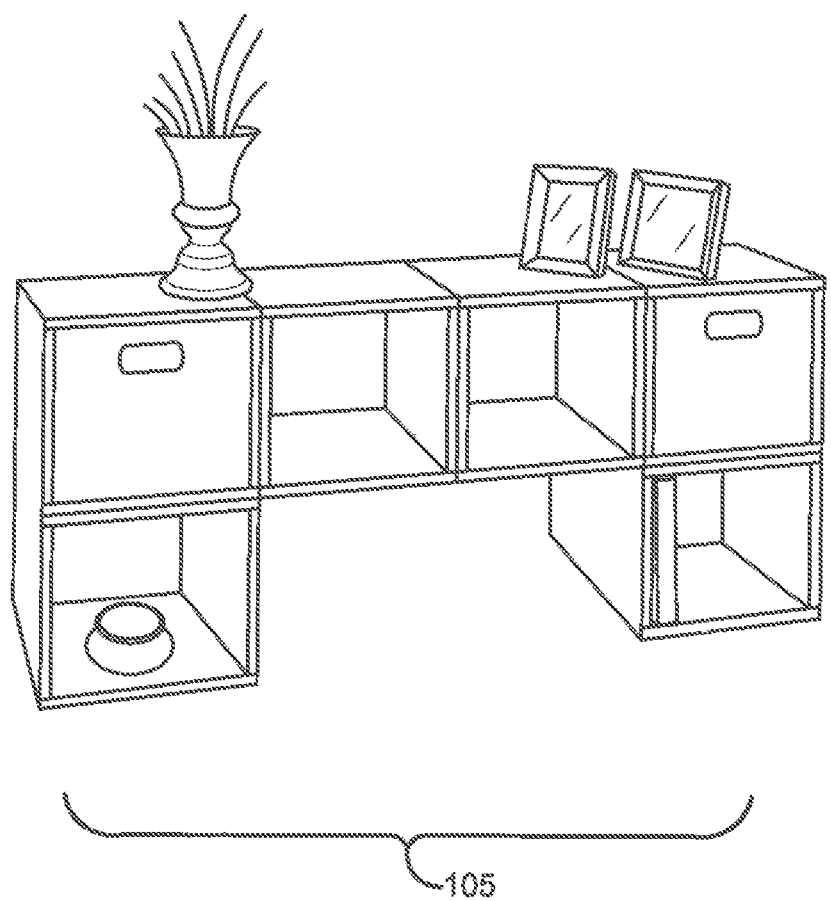
FIG. 8 is a perspective view of a first example of six engaged receptacles.
Figure 9:
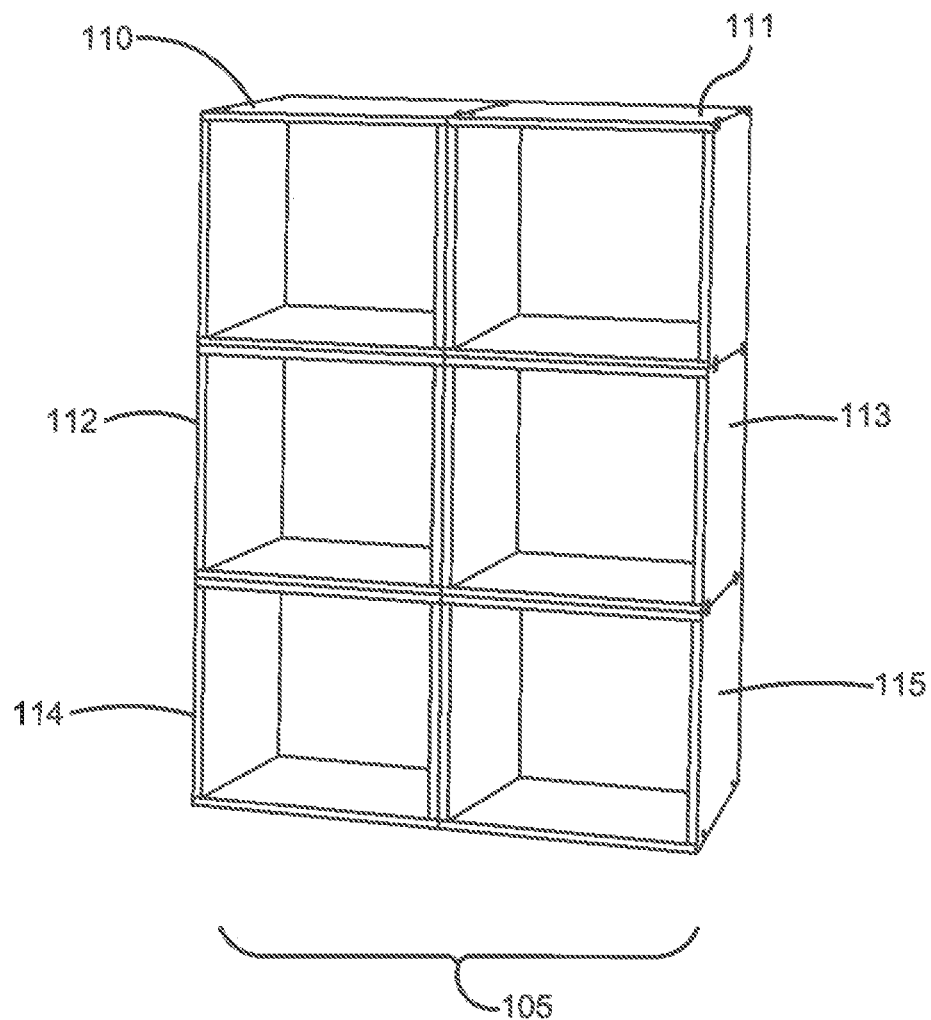
FIG. 9 is a perspective view of a first example of six engaged receptacles.
Figure 10:
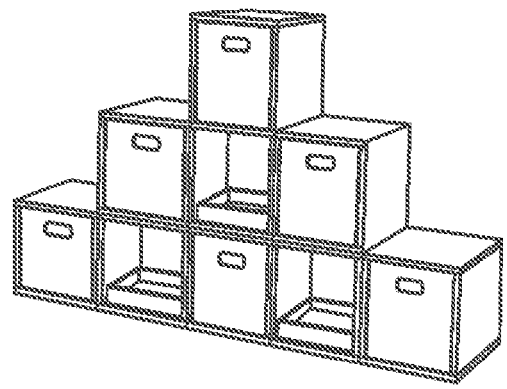
FIG. 10 is a perspective view of a first example of nine engaged receptacles.
Figure 11:
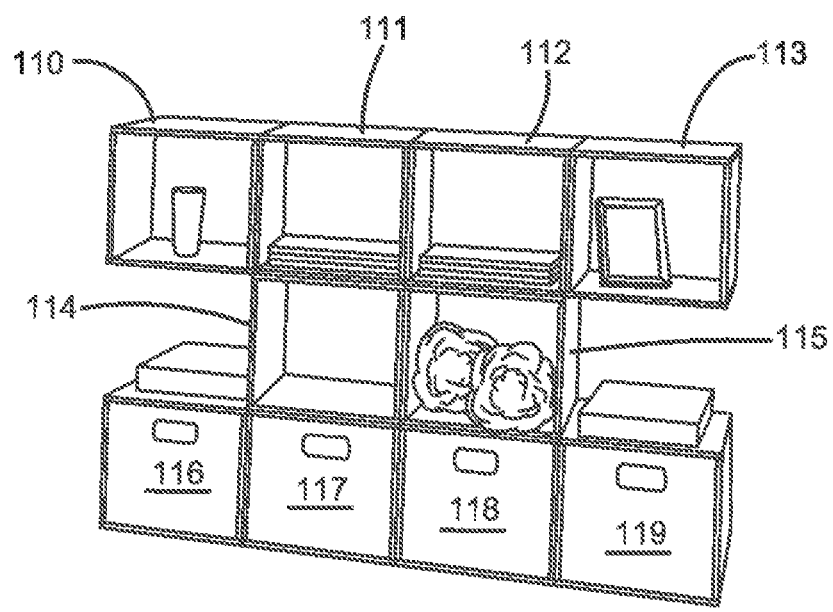
FIG. 11 is a perspective view of a first example of ten engaged receptacles.

With reference now to FIGS. 7-11, the completed receptacles 110, 111, 112, 113, 114, 115, 116, 117, 118, 119 can be stacked and connected in a variety of ways. FIG. 7 shows two receptacles 110, 111 stacked on top of each other. In one aspect, spring pins are inserted into a first receptacle 110 having two openings on the top surface of both the left and right side panels. A second receptacle 111, with two openings on the bottom surface of both the left and right side panels is connected to the first receptacle 110 and the two are connected via the spring pins or mechanical fasteners 140.

Figure 14:
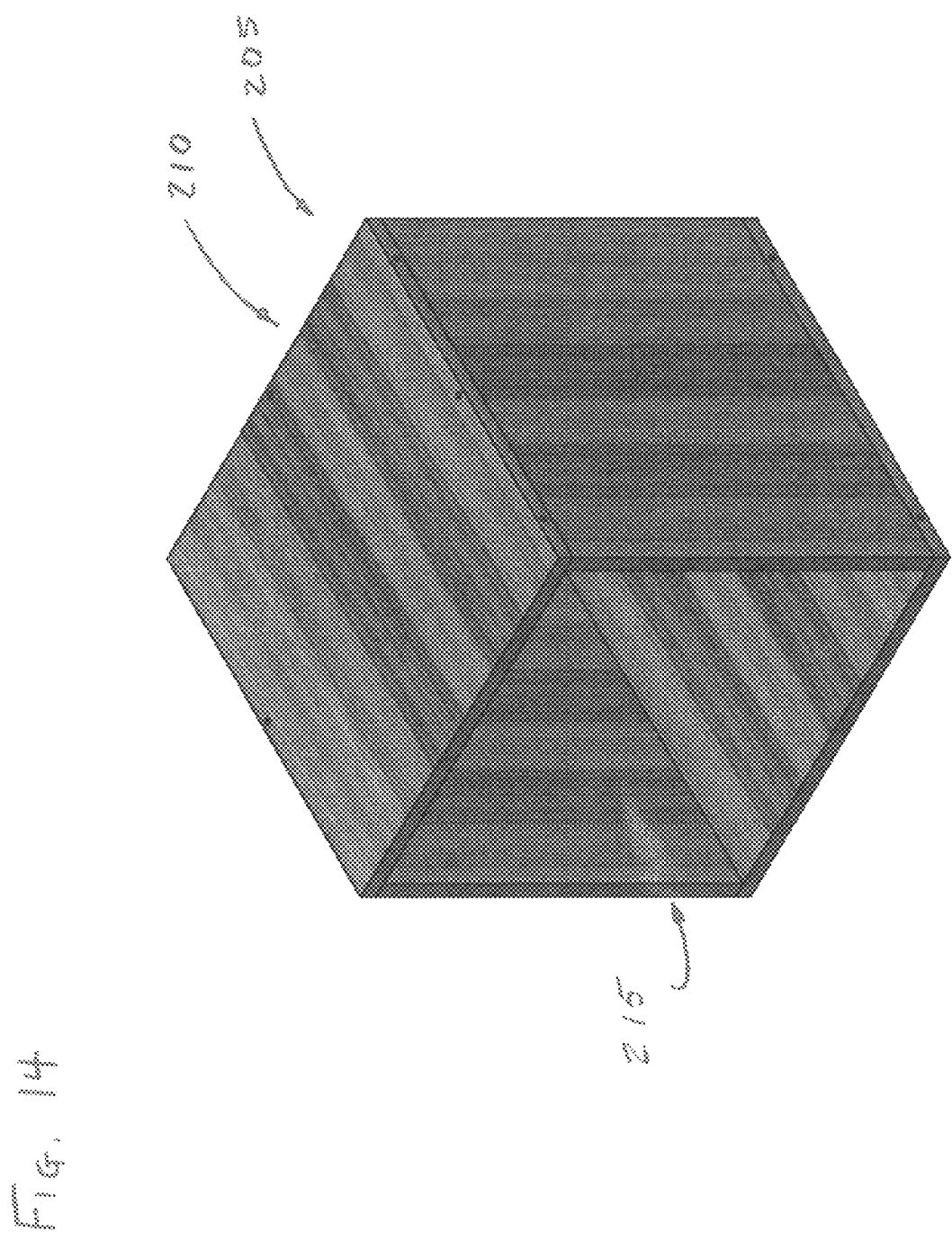
FIG. 14 is a perspective view of a second example of a receptacle.
Figure 15:
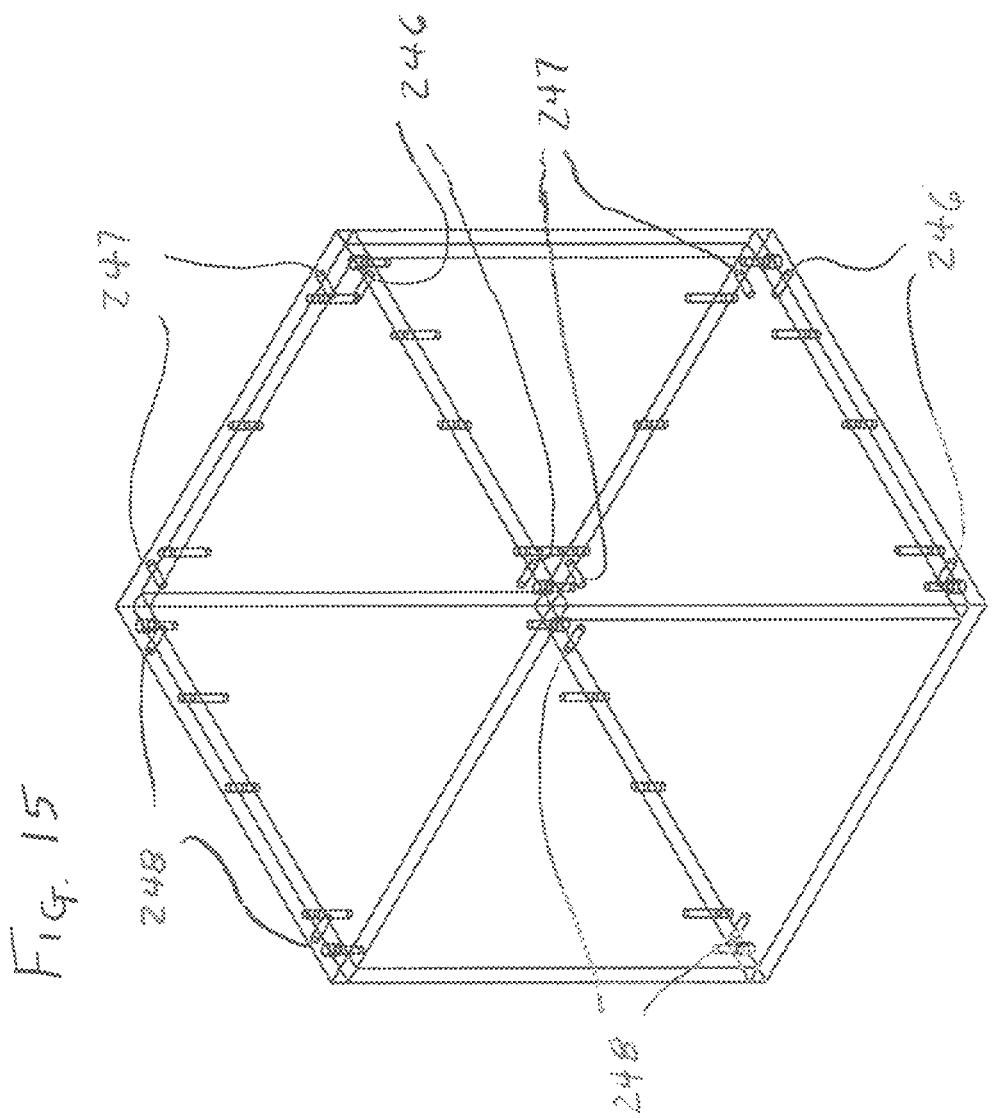
FIG. 15 is a perspective view of a wireframe representation of a second example of a receptacle.

FIG. 14 shows one non-limiting example of a second non-limiting example of a first receptacle 210 of a storage receptacle stacking system which comprises a set of receptacles 205. The first receptacle 210 is a hollow, open rectangular prism. The first receptacle 210 is defined by a back panel 222 and a set of side panels 230 and a set of top and bottom panels 290. In the second non-limiting example of first receptacle 210, the first receptacle 210 is a rectangular prism and, the set of side panels 230 has two panels, the set of top and bottom panels 280 has two panels. The two side panels 230 and the top and bottom panels 280 collectively define each side of the four sides of the rectangular prism base defined by the rectangular back panel 222. The set of receptacles 205 may comprise a first receptacle 210, a second receptacle, and, optionally, one or more other receptacles.

Figure 16:
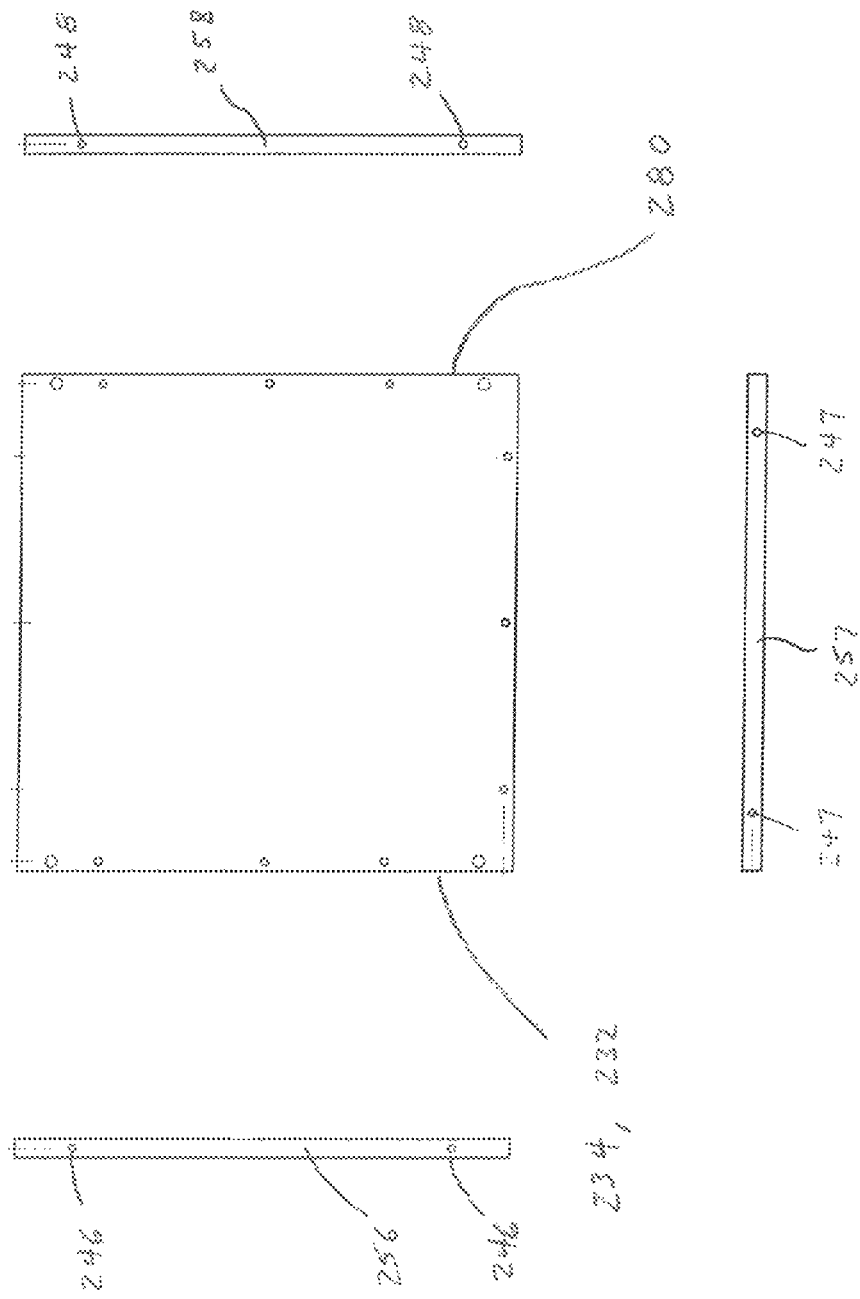
FIG. 16 is an orthogonal projection of a second example of a top panel showing multiple views.
Figure 17:
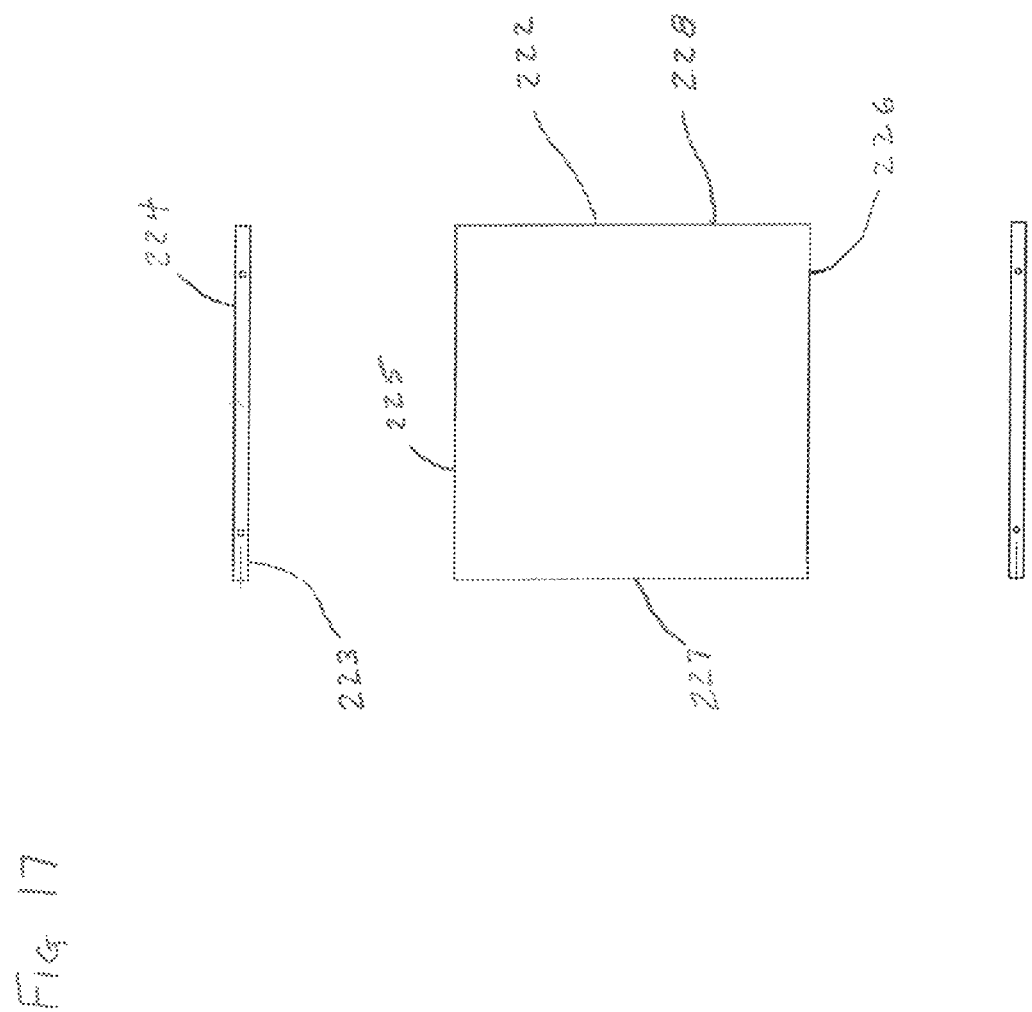
FIG. 17 is an orthogonal projection of a second example of a back panel showing multiple views.
Figure 18:
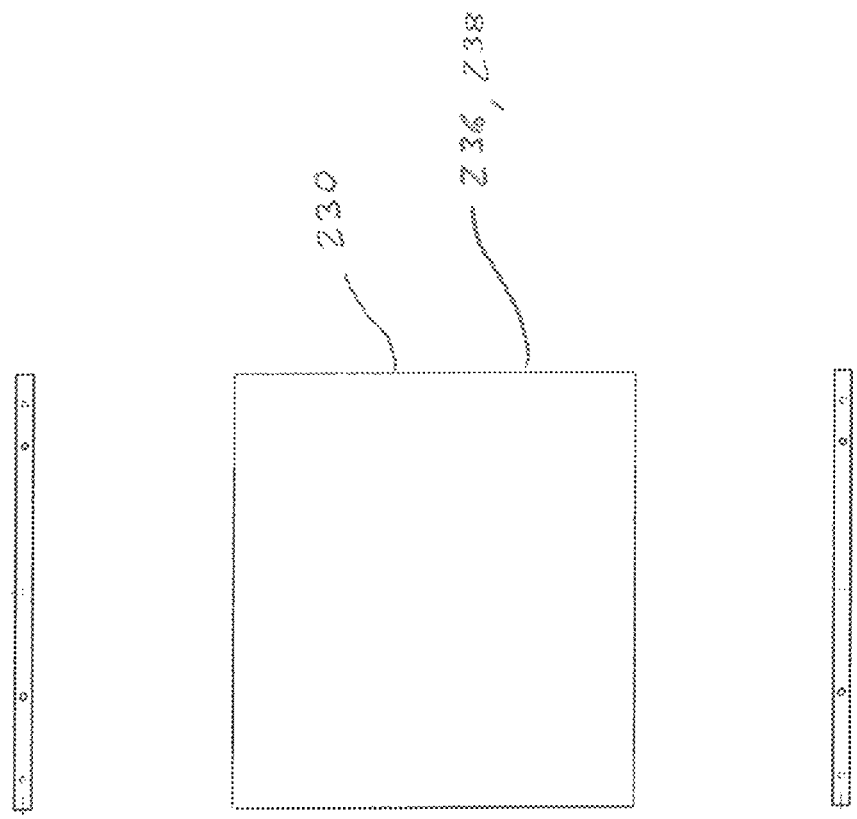
FIG. 18 is an orthogonal projection of a second example of a side panel showing multiple views.
Figure 19:
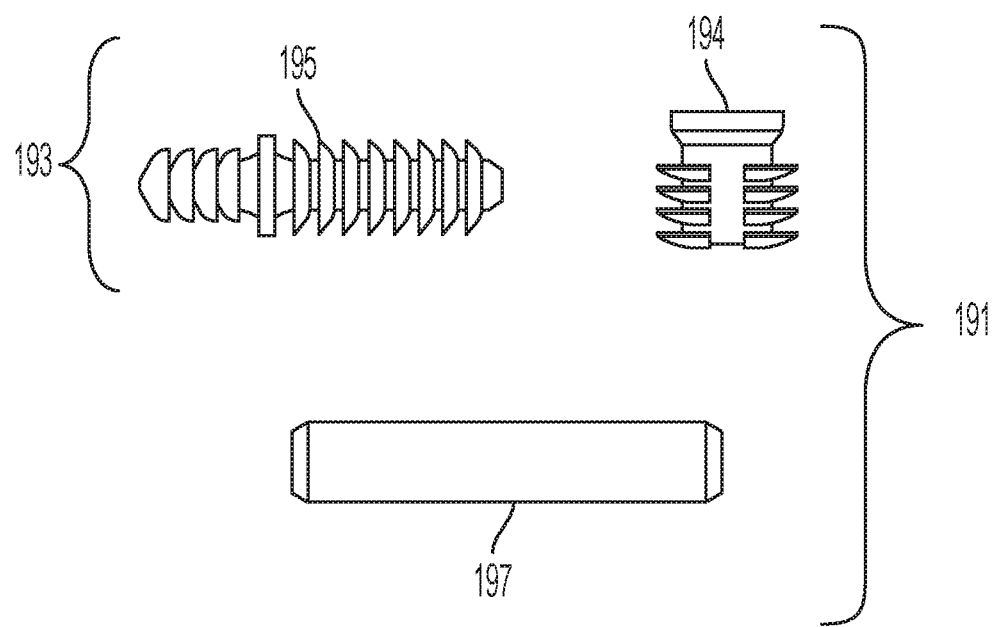
FIG. 19 is a view of various mechanical fasteners.

Referring now to FIGS. 16-18, in the non-limiting example shown, the back panel 222 is substantially planar, rectangular, and has: a first back panel surface 223; a second back panel surface 224 opposite the first back panel surface 223; a top edge 225; a bottom edge 226 opposite the top edge 225; a right edge 227 connecting the top edge 225 and the bottom edge 226; and a left edge 228 opposite the right edge 227, connecting the top edge 225, and the bottom edge 226. In the non-limiting example shown, the set of side panels 230 has a left panel 236, and a right panel 238. In the non-limiting example shown, the set of top and bottom panels 280 has two panels, top panel 232, a bottom panel 234.

In the second non-limiting example shown, the top panel 232 is adjacent to, parallel to, and engaged with the top edge 225 of the back panel 222, and extends perpendicularly from the first back panel surface 223. As shown in FIG. 16, the non-limiting example of the top panel 232 may be substantially planar and rectangular. The non-limiting example of the bottom panel 234 is adjacent to, parallel to, and engaged with the bottom edge 226 of the back panel 222, and extends perpendicularly from the first back panel surface 223. As shown in FIG. 16, the non-limiting example of the bottom panel 234 may be substantially planar and rectangular. The non-limiting example of the left panel 236 is adjacent to, parallel to, and engaged with the left edge 227 of the back panel 222, and extends perpendicularly from the first back panel surface 223. As shown in FIG. 16, the non-limiting example of the left panel 236 may be substantially planar and rectangular. The non-limiting example of the right panel 238 is adjacent to, parallel to, and engaged with the right edge 228 of the back panel 222, and extends perpendicularly from the first back panel surface 223. As shown in FIG. 18, the non-limiting example of the right panel 238 may be substantially planar and rectangular. Each of the panels 232, 234, 236, 238 may be engaged with the back panel 222, or the top panel 232, or the bottom panel 234, by one or more of an adhesive, or a mechanical fastener. An adhesive may be any adhesive chosen with good engineering judgment. A mechanical fastener may be chosen from the fasteners 191 shown in FIG. 19. The fasteners 191 may comprise a cinch joint 193 comprising a female cinch joint component 194, and a male cinch joint component 195, or a spring pin 197, or a combination thereof. A mechanical fastener may further comprise a screw, a bolt, a nut, a clip, a clamp, a pin, a variety of split ring captured pin fastener 140, or other fastener chosen with good engineering judgment.

Referring now to FIGS. 14-19, in the second example, each receptacle 210 in the set of receptacles is removably engaged to at least one other receptacle by a first set of mechanical fasteners such as, without limitation, mechanical fastener 197, or mechanical fastener 193, or mechanical fastener 140. Receptacle 210 may be joined to other similar receptacles 210 in a variety of orientations. The top and bottom panels 234, 232 comprise connection apertures 246, 247, 248 on each of three edge surfaces 256, 257, 258. In the non-limiting second example, the size and shape of the edge surface 256, 257, 258 are the same between one another and the location and size of the connection apertures 246, 247, 248 on each edge surface are the same; the edges are all congruent and the geometry of the connection apertures 246, 247, 248 on any edge surface 256, 257, 258 would coincide with the geometry of the connection apertures 246, 247, 248 on any other edge surface 256, 257, 258 if superimposed thereon. The result is that the receptacle 210 comprises a set of connection apertures that permit the receptacle 210 to be connected with a similar receptacle 210: in parallel; perpendicular; or anti-parallel to one another as viewed looking down at the top panel 232. That is, a first receptacle 210 may be arranged with a similar second receptacle 210 with the left side panel 236 of the first receptacle 210 adjacent to the right side panel 238 of the second receptacle 210 such that the connection apertures 246 of the first receptacle 210 are operatively aligned with the connection apertures 248 of the second receptacle 210 and such that a set of spring pins 197 or other mechanical fastener chosen with good engineering judgment can be operatively engaged with the operatively aligned connection apertures to join the first receptacle 210 and second receptacle 210 in parallel, with their front openings 215 facing the same direction. Similarly, a first receptacle 210 may be arranged with a similar second receptacle 210 with the left side panel 236 of the first receptacle 210 adjacent to the back panel 222 of the second receptacle 210 such that the connection apertures 246 of the first receptacle 210 are operatively aligned with the connection apertures 247 of the second receptacle 210 and such that a set of spring pins 197 or other mechanical fastener chosen with good engineering judgment can be operatively engaged with the operatively aligned connection apertures to join the first receptacle 210 and second receptacle 210 perpendicularly, with their front openings 215 facing at 90 degrees to one another. Similarly, a first receptacle 210 may be arranged with a similar second receptacle 210 with the left side panel 236 of the first receptacle 210 adjacent to the left side panel 236 of the second receptacle 210 such that the connection apertures 246 of the first receptacle 210 are operatively aligned with the connection apertures 246 of the second receptacle 210 and such that a set of spring pins 197 or other mechanical fastener chosen with good engineering judgment can be operatively engaged with the operatively aligned connection apertures to join the first receptacle 210 and second receptacle 210 in anti-parallel, with their front openings 215 facing opposite one another.

In the second non-limiting example, each of the receptacles 210 may be substantially identical in size and shape to one another such that each is congruent with each other. In the second non-limiting example, each receptacle 210 is a prism having an axis of elongation, the receptacles are collectively arranged in an array in which each axis of each prism is parallel with, perpendicular to, or anti-parallel with each other axis of each other prism.

In some examples, the receptacles are formed in such a way that the panels are operatively engaged by mechanical fasteners and the operatively engaged panels shroud the mechanical fasteners connecting them, such that the mechanical fasteners operatively engaging the panels not visible in the finished receptacles.

Further examples consistent with the present subject matter are set out in the following numbered clauses.

Clause 1. A storage receptacle stacking system comprising a set of receptacles having at least a first receptacle and a second receptacle, wherein each receptacle is in the form of an open rectangular prism defined by a substantially planar rectangular back panel having a first back panel surface, the rectangular back panel defined by, a top edge, a bottom edge opposite the top edge, a right edge connecting the top edge and the bottom edge, and a left edge opposite the right edge, connecting the top edge and the bottom edge, and a set of side panels having a substantially planar rectangular top panel, adjacent to, parallel to, and engaged with the top edge of the back panel, extending perpendicularly from the first back panel surface, a substantially planar rectangular bottom panel, adjacent to, parallel to, and engaged with the bottom edge of the back panel, and extending perpendicularly from the first back panel surface, a substantially planar rectangular left panel, adjacent to, parallel to, and engaged with the left edge of the back panel, and extending perpendicularly from the first back panel surface, a substantially planar rectangular right panel, and adjacent to, parallel to, and engaged with the right edge of the back panel, and extending perpendicularly from the first back panel surface; wherein each receptacle is removably engaged to at least one other receptacle by a first set of mechanical fasteners such that, for each receptacle, at least one of the panels in the set of side panels is adjacent to and parallel with at least one of the panels in the set of side panels of another receptacle; and any one of the panels in the set of side panels may be engaged in the alternative with any one of the panels in the set of side panels of any other receptacle.

Clause 2. The storage receptacle stacking system of clause 1, wherein each of the receptacles is substantially identical in size and shape.

Clause 3. The storage receptacle stacking system of clauses 2 or 3, wherein, each of the back panels of each of the receptacles is identical in size and shape; each of the top panels of each of the receptacles is identical in size and shape; each of the bottom panels of each of the receptacles is identical in size and shape; each of the left panels of each of the receptacles is identical in size and shape; and each of the right panels of each of the receptacles is identical in size and shape.

Clause 4. The storage receptacle stacking system of clauses 1-3, wherein each of the receptacles is substantially identical in construction.

Clause 5. The storage receptacle stacking system of clauses 1-4, wherein, in each of the receptacles, each side panel is selectably engageable with each side panel of every other receptacle.

Clause 6. The storage receptacle stacking system of clauses 1-5, wherein, each side panel is selectably and alternatively engageable with each other side panel of another receptacle by a first type of mechanical fastener; each of the first type of mechanical fastener includes an engagement couple that has a first component adapted for selectable engagement with a second component by an associated user; and each of the first components of each first type of mechanical fastener is alternatively engageable with each of the second components of each first type of mechanical fastener.

Clause 7. The storage receptacle stacking system of clauses 1-6 wherein, each engagement couple includes, a male pin, the male pin being substantially cylindrical and having an exterior diameter, a height, an insertion chamfer, and a desertion chamfer; and a female housing having a split ring, the split ring being substantially cylindrical and having an interior diameter, an exterior diameter, a height an insertion chamfer corresponding to the insertion chamfer of the male pin, and a desertion chamfer corresponding to the desertion chamfer of the male pin; and wherein the first component is the male pin and the second component is the female housing, or the first component is the female housing and the second component is the male pin.

Clause 8. The storage receptacle stacking system of clauses 1-7, wherein the set of receptacles has more than two receptacles.

Clause 9. The storage receptacle stacking system of clauses 1-8, wherein the set of receptacles has six or more receptacles.

Clause 10. A method for using a storage receptacle stack system, comprising providing a storage receptacle stacking system having a set of receptacles having at least a first receptacle and a second receptacle, wherein each receptacle is in the form of an open rectangular prism defined by a substantially planar rectangular back panel having a first back panel surface, the rectangular back panel defined by, a top edge, a bottom edge opposite the top edge, a right edge connecting the top edge and the bottom edge, and a left edge opposite the right edge, connecting the top edge and the bottom edge, and a set of side panels having a substantially planar rectangular top panel, adjacent to, parallel to, and engaged with the top edge of the back panel, extending perpendicularly from the first back panel surface, a substantially planar rectangular bottom panel, adjacent to, parallel to, and engaged with the bottom edge of the back panel, and extending perpendicularly from the first back panel surface, a substantially planar rectangular left panel, adjacent to, parallel to, and engaged with the left edge of the back panel, and extending perpendicularly from the first back panel surface, a substantially planar rectangular right panel, and adjacent to, parallel to, and engaged with the right edge of the back panel, and extending perpendicularly from the first back panel surface, wherein each receptacle is removably engaged to at least one other receptacle by a first set of mechanical fasteners such that, for each receptacle, at least one of the panels in the set of side panels is adjacent to and parallel with at least one of the panels in the set of side panels of another receptacle; and any one of the panels in the set of side panels may be engaged in the alternative with any one of the panels in the set of side panels of any other receptacle; and engaging the first receptacle to the second receptacle by the first set of mechanical fasteners such that at least one of the panels in the set of side panels of the first receptacle is adjacent to and parallel with at least one of the panels in the set of side panels of the second receptacle.

Clause 11. The method for using a storage receptacle stack system of clause 10, wherein each of the receptacles is substantially identical in size and shape; each of the back panels of each of the receptacles is identical in size and shape; each of the top panels of each of the receptacles is identical in size and shape; each of the bottom panels of each of the receptacles is identical in size and shape; each of the left panels of each of the receptacles is identical in size and shape; each of the right panels of each of the receptacles is identical in size and shape; each of the receptacles is substantially identical in construction; and in each of the receptacles, each side panel is selectably engageable with each side panel of every other receptacle.

Clause 12. The method for using a storage receptacle stack system of clauses 10 or 11, wherein each side panel is selectably and alternatively engageable with each other side panel of another receptacle by a first type of mechanical fastener, each of the first type of mechanical fastener includes an engagement couple that has a first component adapted for selectable engagement with a second component by an associated user, and each of the first components of each first type of mechanical fastener is alternatively engageable with each of the second components of each first type of mechanical fastener; and wherein, each engagement couple includes, a male pin, the male pin being substantially cylindrical and having an exterior diameter, a height, an insertion chamfer, and a desertion chamfer, and a female housing having a split ring, the split ring being substantially cylindrical and having an interior diameter, an exterior diameter, a height an insertion chamfer corresponding to the insertion chamfer of the male pin, and a desertion chamfer corresponding to the desertion chamfer of the male pin, and wherein the first component is the male pin and the second component is the female housing, or the first component is the female housing and the second component is the male pin.

Clause 13. The method for using a storage receptacle stack system of clauses 10-12, wherein the set of receptacles has more than two receptacles.

Clause 14. The method for using a storage receptacle stack system of clauses 10-13, wherein the set of receptacles has six or more receptacles.

Clause 15. A storage receptacle stacking system comprising a set of receptacles having at least a first receptacle and a second receptacle, wherein each receptacle is in the form of an open rectangular prism defined by a substantially planar rectangular back panel having a first back panel surface, the rectangular back panel defined by, a top edge, a bottom edge opposite the top edge, a right edge connecting the top edge and the bottom edge, and a left edge opposite the right edge, connecting the top edge and the bottom edge, and a set of side panels having a substantially planar rectangular top panel, adjacent to, parallel to, and engaged with the top edge of the back panel, extending perpendicularly from the first back panel surface, a substantially planar rectangular bottom panel, adjacent to, parallel to, and engaged with the bottom edge of the back panel, and extending perpendicularly from the first back panel surface, a substantially planar rectangular left panel, adjacent to, parallel to, and engaged with the left edge of the back panel, and extending perpendicularly from the first back panel surface, a substantially planar rectangular right panel, and adjacent to, parallel to, and engaged with the right edge of the back panel, and extending perpendicularly from the first back panel surface; wherein each receptacle is removably engaged to at least one other receptacle by a first set of mechanical fasteners such that, for each receptacle, at least one of the panels in the set of side panels is adjacent to and parallel with at least one of the panels in the set of side panels of another receptacle; and any one of the panels in the set of side panels may be engaged in the alternative with any one of the panels in the set of side panels of any other receptacle; wherein each of the receptacles is substantially identical in size and shape; wherein, each of the back panels of each of the receptacles is identical in size and shape, each of the top panels of each of the receptacles is identical in size and shape, each of the bottom panels of each of the receptacles is identical in size and shape, each of the left panels of each of the receptacles is identical in size and shape, and each of the right panels of each of the receptacles is identical in size and shape; wherein each of the receptacles is substantially identical in construction; wherein, in each of the receptacles, each side panel is selectably engageable with each side panel of every other receptacle; wherein, each side panel is selectably and alternatively engageable with each other side panel of another receptacle by a first type of mechanical fastener, each of the first type of mechanical fastener includes an engagement couple that has a first component adapted for selectable engagement with a second component by an associated user, and each of the first components of each first type of mechanical fastener is alternatively engageable with each of the second components of each first type of mechanical fastener; wherein, each engagement couple includes, a male pin, the male pin being substantially cylindrical and having an exterior diameter, a height, an insertion chamfer, and a desertion chamfer; and a female housing having a split ring, the split ring being substantially cylindrical and having an interior diameter, an exterior diameter, a height an insertion chamfer corresponding to the insertion chamfer of the male pin, and a desertion chamfer corresponding to the desertion chamfer of the male pin; and wherein the first component is the male pin and the second component is the female housing, or the first component is the female housing and the second component is the male pin; and wherein the set of receptacles has six or more receptacles.

Various examples have been described above for providing a modular furniture item. Those skilled in the art will understand, however, that changes and modifications may be made to those examples without departing from the spirit and scope of the following claims and their equivalents.

The examples have been described, hereinabove. It will be apparent to those skilled in the art that the above methods and apparatuses may incorporate changes and modifications without departing from the general scope of the present teachings. It is intended to include all such modifications and alterations insofar as they come within the scope of the appended claims or the equivalents thereof. Although the description above contains much specificity, this should not be construed as limiting the scope of the present teachings, but as merely providing illustrations of some of the examples of the present teachings. Various other examples and ramifications are possible within its scope.

The foregoing detailed description is given primarily for clearness of understanding and no unnecessary limitations are to be understood therefrom, for modification will become obvious to those skilled in the art upon reading this disclosure. Accordingly, the present subject matter is not intended to be limited by the specific exemplifications presented hereinabove. Rather, what is intended to be covered is within the spirit and scope of the appended claims.

Furthermore, notwithstanding that the numerical ranges and parameters setting forth the broad scope of the present subject matter are approximations, the numerical values set forth in the specific examples are reported as precisely as possible. Any numerical value, however, inherently contain certain errors necessarily resulting from the standard deviation found in their respective testing measurements.

What is claimed is:

1. A storage receptacle stacking system comprising:
   a set of receptacles having at least a first receptacle and a second receptacle, wherein
   at least the second receptacle is substantially identical in construction with the first receptacle, and the first receptacle is in the form of an open rectangular prism defined by
   a substantially planar rectangular first back panel having a first back panel inside surface, a first back panel outside surface, the substantially planar rectangular first back panel defined by,
   a first back panel top edge,
   a first back panel bottom edge opposite the first back panel top edge,
   a first back panel right edge connecting the top edge and the first back panel bottom edge,
   and a first back panel left edge opposite the first back panel right edge,
   connecting the first back panel top edge and the first back panel bottom edge,
   a substantially planar rectangular first top panel engaged with the first back panel,
   extending perpendicular with the first back panel inside surface, wherein the first top panel has a first top panel inside surface, a first top panel outside surface, at least two first top panel edge surfaces with at least one first top panel connection aperture in each of the at least two top panel edge surfaces,
   a substantially planar rectangular first bottom panel engaged with the first back panel,
   and extending perpendicular with the first back panel inside surface, wherein the first bottom panel has a first bottom panel inside surface, a first bottom panel outside surface, at least two first bottom panel edge surfaces with at least one first bottom panel connection aperture in each of the at least two first bottom panel edge surfaces,
a substantially planar rectangular first left panel engaged with the first back panel,
and extending perpendicular with the first back panel inside surface, wherein the first left panel has a first left panel inside surface, a first left panel outside surface, at least two first left panel edge surfaces extending perpendicular with the first back panel inside surface, and the first left panel outside surface has a first left panel outside surface plurality of connection apertures, and at least one first left panel connection aperture in each of the at least two first left panel edge surfaces,
a substantially planar rectangular first right panel engaged with the first back panel,
and extending perpendicular with the first back panel inside surface, with the first right panel having a first right panel inside surface, a first right panel outside surface, at least two first right panel edge surfaces extending perpendicular with the first back panel inside surface, and the first right panel outside surface has a first right panel outside surface plurality of connection apertures, and at least one first right panel connection aperture in each of the two first right panel edge surfaces;
the second receptacle having
at least two second left panel edge surfaces each having at least one second left panel connection aperture;
at least two second right panel edge surfaces each having at least one second right panel connection aperture;
wherein one of the first left or first right panel surface edges is removably engaged with one of the second left or second right surface edges via one of a first set of straight mechanical fasteners inserted into one of the first left or right panel connection apertures and one of the second left or right panel connection apertures and the straight mechanical fastener is not visible; and
wherein each receptacle is removably engaged to at least one other receptacle by the first set of straight mechanical fasteners such that,
for each receptacle,
at least one panel of a receptacle of the set of receptacles is adjacent to and parallel with a panel of another receptacle of the set of receptacles.

2. The storage receptacle stacking system of claim 1 wherein each of the receptacles is substantially identical in size and shape.

3. The storage receptacle stacking system of claim 2, wherein, each of the back panels of each of the receptacles is identical in size and shape; each of the top panels of each of the receptacles is identical in size and shape; each of the bottom panels of each of the receptacles is identical in size and shape; each of the left panels of each of the receptacles is identical in size and shape; and each of the right panels of each of the receptacles is identical in size and shape.

4. The storage receptacle stacking system of claim 1 wherein each of the receptacles is substantially identical in construction.

5. The storage receptacle stacking system of claim 4, wherein, in each of the receptacles, each left or right panel is selectably engageable with each left or right panel of every other receptacle.

6. The storage receptacle stacking system of claim 5, wherein, each left or right panel is selectably and alternatively engageable with each other left or right panel of another receptacle by the first type of a straight mechanical fastener; each of the first type of straight mechanical fastener includes an engagement couple that has a first component adapted for selectable engagement with a second component by an associated user; and each of the first components of each first type of straight mechanical fastener is alternatively engageable with each of the second components of each first type of straight mechanical fastener.

7. The storage receptacle stacking system of claim 1, wherein the set of receptacles has more than two receptacles.

8. The storage receptacle stacking system of claim 7, wherein the set of receptacles has six or more receptacles.

9. A method for using the storage receptacle stacking system of claim 1, comprising the steps of: providing the storage receptacle stacking system having the set of receptacles having at least the first receptacle and the second receptacle; engaging the first receptacle to the second receptacle via the straight mechanical fastener inserted into one of the first left or right panel connection apertures and one of the second left or right panel connection apertures and the straight mechanical fastener is not visible.

10. The method for using a storage receptacle stacking system of claim 9, wherein each of the receptacles is substantially identical in size and shape; each of the back panels of each of the receptacles is identical in size and shape; each of the top panels of each of the receptacles is identical in size and shape; each of the bottom panels of each of the receptacles is identical in size and shape; each of the left panels of each of the receptacles is identical in size and shape; each of the right panels of each of the receptacles is identical in size and shape; each of the receptacles is substantially identical in construction; and in each of the receptacles, each left or right panel is selectably engageable with each left or right panel of every other receptacle.

11. A kit for assembling into a storage receptacle stacking system of a plurality of receptacles comprising:
at least two substantially planar rectangular back panels with the at least two back panels being substantially identical in construction;
at least eight substantially planar rectangular side panels, each side panel having two panel surfaces opposite each other with at least four side panels having a first panel surface having at least 3 first panel surface connection apertures; each side panel having four side panel edge surfaces with at least one side panel edge connection aperture in at least one of the four side panel edge surfaces and at least one side panel edge connection aperture in an opposite side panel edge, and the side panel edge connection apertures and the at least 3 first panel surface apertures; are similarly sized, wherein for each side panel there is at least one other side panel of identical size and shape; with
a plurality of at least four mechanical fasteners sized to simultaneously fit into the side panel edge connection apertures and the similarly sized at least 3 first panel surface apertures.

12. The kit of claim 11, wherein each of the side panels are identical in size and shape.

13. The kit of claim 11, wherein for every receptacle to be assembled there is at least one back panel, at least four side panels and at least four mechanical fasteners.

14. The kit of claim 12, wherein for every receptacle of the storage receptacle stacking system there is at least one of the back panels and at least four side panels and at least four mechanical fasteners.

* * * * *